United States Patent
Marcillaud

[15] 3,700,006
[45] Oct. 24, 1972

[54] ANGLE COCK

[72] Inventor: Roger Marcillaud, Saint Denis, France

[73] Assignee: Compagnie Des Freins Et Signaux Westinghouse, Freinville-Sevran, France

[22] Filed: May 21, 1970

[21] Appl. No.: 39,333

[30] Foreign Application Priority Data

June 17, 1969 France......................6920195

[52] U.S. Cl..............................137/625.21, 251/172
[51] Int. Cl................................................F16k 11/08
[58] Field of Search........137/625.21, 625.47, 625.22, 137/625.41, 625.43, 625.46; 251/171–175

[56] References Cited

UNITED STATES PATENTS

| | | |
|---|---|---|
| 3,437,106 | 4/1969 | Mueller et al.....137/625.22 X |
| 2,520,288 | 8/1950 | Shand et al................251/174 |
| 3,047,265 | 7/1962 | Kaiser........................251/172 |
| 2,839,074 | 6/1958 | Kaiser....................251/174 X |
| 2,916,254 | 12/1959 | Wendell...................251/172 |
| 3,357,679 | 12/1967 | Gulick..................251/175 X |
| 2,661,926 | 12/1953 | Resek...................137/625.47 |

Primary Examiner—Henry T. Klinksiek
Attorney—Ralph W. McIntire, Jr.

[57] ABSTRACT

An angle cock has a body provided with a chamber into which opens an inlet port, a delivery port and an exhaust port. A ball-type valve disposed in the chamber is formed intermediate the ends of a valve stem rotatably mounted in a bore provided therefor in the body. A passageway extends through the ball to provide communication either between the inlet and delivery ports or between the delivery and exhaust ports. A valve cover member carried on the end of a pipe has two concentric skirts the larger of which is disposed in the inlet port and also serves to support the valve stem. Disposed between the inner and outer skirts is a sealing member biased against the surface of the ball by a Belleville spring interposed between this sealing member and the cover member. This sealing member includes a piston carrying two resilient annular seals which respectively form seals with the surface of the ball and either a shoulder formed on the cover member or a shoulder formed on the piston accordingly as the pressure in the inlet port exceeds or is less than the pressure in the delivery port. Thus, while in the closed position of the ball valve, flow through angle cock is prevented irrespective of whether the inlet port is subject to pressure or vacuum.

6 Claims, 2 Drawing Figures

PATENTED OCT 24 1972

3,700,006

INVENTOR.
ROGER MARCILLAUD
BY Ralph W. McIntosh, Jr.
ATTORNEY

ANGLE COCK

The present invention has for its object a ball-type angle cock particularly of the type employed on railroads for connecting compressed air conduits between the main conduit of each vehicle and the corresponding flexible hoses.

Such cocks comprise generally an active part, or a plug, disposed in the body of the cock and through which passes a conduit perpendicular to the axis of the plug and capable in the open position to connect a passage provided in the cover intended for connection with the main conduit to a second passage intended for connection with a flexible hose, and in its closed position to close the passage connected with the main conduit, at the same time connecting the connecting passage with a flexible hose and an escape opening discharging to atmosphere. Furthermore, the tightness between the plug and different passages is achieved by two joints each having an annular rim intended to rest against the surface of the plug and connected to a stud (talon) fixed on the body of the cock. The negative feature of these cocks resides in the fact that the tightness of the joint placed between the plug and the main conduit is liable to be broken on account of a poor contact with the plug, particularly when the main conduit is under pressure lower than atmospheric.

The present invention avoids aforementioned negative feature and has for its object a cock very cheap to make and having a particularly strong plug.

The invention has for its object a ball-type angle cock capable of connecting together one or several openings of the type comprising a body, a cover, a rotary plug having generally spherical configuration and capable of having a flattened portion, can be perforated by a conduit perpendicular to the axis of said plug and at least one sealing member placed between the plug and an opening characterized by the fact that the plug and its valve operating stem are made in a single piece and that this stem is axially supported by the cover which supports the sealing member placed between the plug and an opening.

On this account it is possible to impart to the plug a large diameter, thus making it stronger, which permits to simplify the cock and to make its plug of a light alloy and even of an elastomer, with members intended for connecting the valve stem with manipulating handles made, for example, of steel and inserted in the cock during molding.

According to another feature, the cock comprises a reversible valve stem having two terminal bearings each disposed in a bore provided in the body of the cock which permits manipulating handles being strictly interchangeable.

The invention will be better understood upon reading the following specification given in a way of an unlimiting example in reference to the attached drawings, in which.

Figure 1:
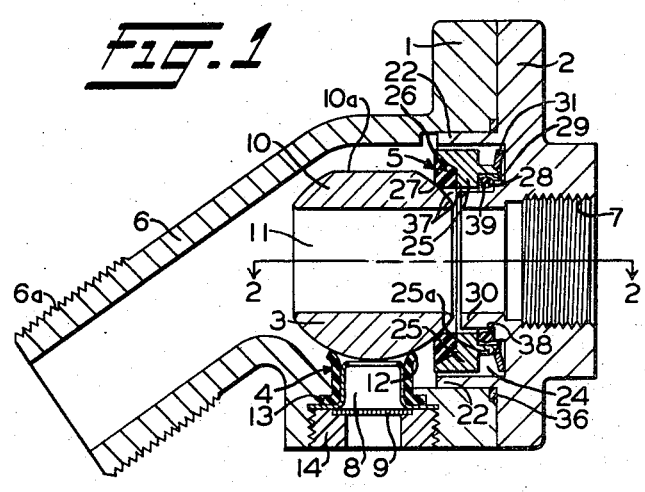
FIG. 1 is a section of FIG. 2 of one way of reducing the angle cock according to the invention to practice along the 1 — 1 line.
Figure 2:
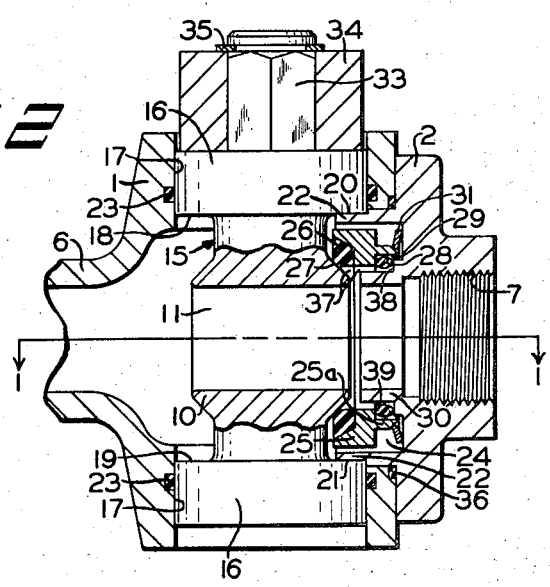
FIG. 2 is a section of FIG. 1 along the 2 — 2 line.

The angle cock shown in the drawings comprises substantially body 1, cover 2, rotating plug 3 and two sealing members 4 and 5.

Body 1 is provided with an oblique pipe 6, the end of which 6a is threaded for connection to a flexible hose, which is not shown, while cover 2, fastened to body 1 by any suitable means, such as stud bolts provided with nuts, has an inlet bore 7 for its connection to the main compressed-air line.

Body 1 has in addition an exhaust passageway 8 preferably directed downwards when the angle cock is in place and which is protected with a filter 9, made for example, of expanded metal. Plug 3 comprises a spherical configuration, or ball 10, through which passes conduit 11 perpendicular to the axis of the plug which may, or may not, have a flattened portion 10a facilitating the opening of the angle cock.

The sealing member 4, preferably made of an elastomer or any other appropriate material, has a circular shape and a rim 12 intended to rest against the ball of the plug. Furthermore, sealing member 4 has collar 13 intended to be compressed between body 1 and perforated plug 14 screwed in body 1. Filter 9 is placed in plug 14.

According to the invention, the ball 10 and its valve operating stem 15 are made integral, valve stem 15 being guided and held laterally or supported by cover 2.

To achieve this purpose, valve operating stem 15 has at each end a boss 16 disposed in bore 17 provided in the body 1 of the angle cock and resting by its surfaces 18 and 19 on flat surfaces 20 and 21 of lateral bearings milled in skirt 22 of cover 2. Tightening packings 23, preferably toroidal packing, are placed in annular grooves and assure the tightness of each boss 16 in body 1 of the angle cock.

According to another modification, cover 2, the tightness of which in respect to body 1 is assured by packing 36, has cavity 24, in which is placed sealing member 5 consisting of piston 25 carrying sealing ring 26 made of an elastomer or any other appropriate material, and of which the contact zone 27 with the plug is situated along the transverse axis of the toroidal tightening packing 28 placed between the wall surface of counterbore 29 in piston 25 and the outside surface of an inner skirt 30 of cover 2. The section of sealing ring 26 which is guided by surface of inner skirt 30 of cover 2 is determined so as to obtain a pneumatic or hydraulic pressure on piston 25 to press sealing ring 26 against ball 10. This pressure is added to that provided by elastic elements, namely Belleville springs or corrugated washers 31, placed in cavity 24 provided between skirt 25a of piston 25 and cover 2. The outer end of skirt 25a is beveled on its outer periphery.

The pressure created by the effect of pressure of fluid circulating inside of the angle cock presses sealing ring 26 against ball 10 both when inlet opening 7 finds itself under a higher pressure than that existing in pipe 6 and in an opposite case taking place when the main conduit of a train is placed under subatmospheric pressure for operating the discharge valves by vacuum.

In case when bore 7 is under a higher pressure than pipe 6, the fluid penetrates, through space 37 limited by piston 25 and exterior surface on inner skirt 30 of cover 2 and pushes packing 28 into the bottom of counterbore 29 in order to assure frontal tightness on shoulder 38 of cover 2.

When bore 7 is under a lower pressure than pipe 6, packing 28 is pushed by pressure existing in pipe 6 to the other end of counterbore 29 to assure frontal tightness on shoulder 39 of piston 25.

In these two cases force of pressure applied to annular surface between the inner or outer periphery of packing 28 and contact zone 27 presses piston 25 against ball 10.

Since the valve operating stem 15 is completely reversible, a connecting member 33 of a known type is provided; notably a square to connect operating handle 34 and ball 10. Handle 34 and connecting member 33 are held in position by snap ring 35 or by any other appropriate means.

The type of the angle cock according to the invention is not limited to railroad applications and to compressed air. In particular, the device for atmospheric discharge of pipe 6 can be eliminated, and the angle cock can be used with other gases than air or with liquids. Materials used for different parts of the angle cock can be materials resistant to corrosion which could be produced by fluids passing through the angle cock.

When the diameter of ball 10 is greater than that of bosses 16, body 1 consisting of two parts is provided.

Having now described the invention, what I claim as new and desire to secure by Letters Patent, is:

1. A ball-type angle cock comprising:
   a. a casing having a valve chamber into which opens an inlet port, a delivery port and an exhaust port, said casing being provided with a bore opening into said chamber,
   b. a ball valve having thereon a sealing surface and a passageway extending therethrough so that said surface is disposed about each end thereof, said ball valve being provided with an operating stem which has thereon two spaced-apart cylindrical bosses rotatably mounted in said bore in said casing, the adjacent ends of said cylindrical bosses constituting flat annular bearing surfaces,
   c. a cover member having a passageway extending therethrough and two concentric skirts coaxial therewith, the larger of which is disposed in said inlet port in said casing and is provided on its outer periphery with two diametrically arranged parallel flat surfaces for rotatably supporting thereon said flat annular bearing surfaces,
   d. sealing means disposed between said skirts and compressed between said cover and said sealing surface on said ball valve, said sealing means comprising:
      i. an annular piston being provided on one side with an annular resilient member for forming a seal with said sealing surface and on the other side with a skirt tapered at its outer end, and
      ii. a resilient annular member disposed between the outer peripheral surface of the smaller of said skirts on said cover and the inner wall surface of said skirt on said annular piston, said resilient annular member forming a seal between said annular piston and said cover member irrespective of the direction of a fluid pressure force acting thereon, and
   e. at least one Belleville spring so disposed that its larger end abuts said cover member and its smaller end abuts the tapered outer end of said skirt on said annular piston, said Belleville spring being effective to bias said annular resilient member on said one side of said annular piston against said sealing surface on said ball valve.

2. A ball-type angle cock comprising:
   a. a casing having a valve chamber into which opens an inlet port, a delivery port and an exhaust port, said casing being provided with a bore opening into said chamber,
   b. a ball valve having thereon a sealing surface and a passageway extending therethrough so that said surface is disposed about each end thereof, said ball valve having integral therewith and extending in opposite directions therefrom an operating stem rotatably mounted in said bore for rotating said ball valve to selected angular positions,
   c. a cover member having a passageway extending therethrough and two concentric skirts coaxial therewith, the larger of said skirts being disposed in said inlet port in said casing,
   d. a first sealing member for forming a seal with said sealing surface of said ball valve, said first sealing member comprising:
      i. an annular piston disposed between said concentric skirts, said piston being provided on one side with an annular resilient member, and
      ii. means interposed between said cover and said annular piston for biasing said resilient member on said one side of said piston against said sealing surface, and
   e. a second sealing member removably mounted in said exhaust port for forming a seal with said sealing surface of said ball valve.

3. A ball-type angle cock, as recited in claim 2, further characterized in that said cover member and said annular piston on their adjacent sides are each provided with a shoulder, and a resilient member is disposed between said annular piston and the inner one of said skirts, said resilient member being moved into sealing engagement with the shoulder on said cover member upon the pressure in said inlet port exceeding the pressure in said delivery port, and into sealing engagement with the shoulder on said annular piston upon the pressure in said delivery port exceeding the pressure in said inlet port.

4. A ball-type angle cock, as recited in claim 2, further characterized in that said operating stem is provided with two spaced-apart cylindrical bosses each having a flat surface thereon facing the flat surface on the other cylindrical boss, and the outer peripheral surface of the larger of said two concentric skirts is provided with two spaced-apart flat surfaces each constituting a bearing surface for a flat surface on an adjacent cylindrical boss whereby said biasing means provides a uniform force urging the annular surface on said annular resilient member against the said sealing surface on said ball valve irrespective of the disposition of said valve stem in said bore in said casing.

5. A ball-type angle cock, as recited in claim 2, further characterized in that said second sealing member comprises:
   a. a rigid sleeve having an outturned flange at one end and being inwardly flared at its opposite end, b. a resilient sleeve disposed about said rigid sleeve and having an inside diameter substantially the same as the outside diameter of said rigid sleeve, the length of said resilient sleeve exceeding the length of said rigid sleeve, said resilient sleeve having at one end an outturned flange that abuts said outturned flange on said rigid sleeve and being outwardly flared at its opposite end for forming a seal with the sealing surface on said ball valve, and c. means for urging said outturned flanges against said casing and said outwardly flared end of said resilient sleeve against the sealing surface on said ball valve.

6. A ball-type angle cock, as recited in claim 12, further characterized in that said means interposed between said cover and said annular piston is at least one Belleville spring.

* * * * *